(12) United States Patent
Park et al.

(10) Patent No.: US 12,233,787 B2
(45) Date of Patent: Feb. 25, 2025

(54) TETHER CLIP AND PILLAR COUPLING STRUCTURE PROVIDED WITH THE SAME

(71) Applicants: HYUNDAI MOTOR COMPANY, Seoul (KR); KIA CORPORATION, Seoul (KR); NIFCO KOREA INC., Anyang-si (KR)

(72) Inventors: Jiseob Park, Incheon (KR); Hongkeun Son, Hwaseong-si (KR); Jaewon Park, Hwaseong-si (KR); Yoo Sung Doh, Anyang-si (KR)

(73) Assignees: HYUNDAI MOTOR COMPANY, Seoul (KR); KIA CORPORATION, Seoul (KR); NIFCO KOREA INC., Asan-si (KR)

( * ) Notice: Subject to any disclaimer, the term of this patent is extended or adjusted under 35 U.S.C. 154(b) by 383 days.

(21) Appl. No.: 17/832,390

(22) Filed: Jun. 3, 2022

(65) Prior Publication Data

US 2023/0030083 A1 Feb. 2, 2023

(30) Foreign Application Priority Data

Jul. 23, 2021 (KR) .......... 10-2021-0097196

(51) Int. Cl.
*B60R 21/213* (2011.01)
*B60R 13/02* (2006.01)
(Continued)

(52) U.S. Cl.
CPC ........ *B60R 13/0206* (2013.01); *B60R 21/213* (2013.01); *F16B 21/065* (2013.01);
(Continued)

(58) Field of Classification Search
CPC ............... B60R 21/213; B60R 21/216; B60R 2021/2161; B60R 2021/2163;
(Continued)

(56) References Cited

U.S. PATENT DOCUMENTS 6,053,527 A * 4/2000 Gans ..................... B60R 21/215
280/728.1
7,155,783 B2 * 1/2007 Nessel ............... B60R 13/0206
24/297
(Continued)

FOREIGN PATENT DOCUMENTS

JP 5471531 B2 4/2014

*Primary Examiner* — Amy R Weisberg
*Assistant Examiner* — Denise Lynne Esquivel
(74) *Attorney, Agent, or Firm* — Lempia Summerfield Katz LLC

(57) ABSTRACT

A tether clip includes a clip body including a panel anchor part and a trim anchor portion connected to the panel anchor part. The clip body has a moving space therein and a trim trigger in the trim anchor portion to be deformable in the moving space direction. The tether clip has a head anchor part with a head hook thereon, a tether connecting the clip body and the head anchor part, and a coupling pin. The coupling pin is inserted into the moving space and includes an inclined slope configured to contact the trim trigger and move the coupling pin toward the panel anchor portion when the trim trigger is deformed inside.

18 Claims, 19 Drawing Sheets

(51) Int. Cl.
*F16B 21/06* (2006.01)
*F16B 21/08* (2006.01)
*B60R 21/216* (2011.01)

(52) U.S. Cl.
CPC .......... *F16B 21/082* (2013.01); *F16B 21/086* (2013.01); *B60R 13/025* (2013.01); *B60R 2013/0287* (2013.01); *B60R 21/216* (2013.01)

(58) Field of Classification Search
CPC .............. B60R 13/0206; B60R 13/025; B60R 2013/0287; F16B 21/065; F16B 2/08; F16B 2/22; F16B 19/004; F16B 19/1081; F16B 21/082; F16B 21/086; B60Y 2304/07
USPC .............................................. 296/37.13, 1.08
See application file for complete search history.

(56) References Cited

U.S. PATENT DOCUMENTS

| | | | | |
|---|---|---|---|---|
| 8,316,514 B2* | 11/2012 | Sano | ........................ | B60R 13/02 24/297 |
| 9,487,162 B2* | 11/2016 | Inagawa | ............... | B60R 21/213 |
| 9,751,489 B2* | 9/2017 | Yamamoto | ............ | F16B 21/086 |
| 2013/0257025 A1* | 10/2013 | Yamamoto | ............ | B60R 21/217 411/356 |
| 2015/0132078 A1* | 5/2015 | Yamamoto | .............. | F16B 21/12 411/22 |
| 2016/0101756 A1* | 4/2016 | Benedetti | .............. | F16B 21/075 24/464 |
| 2022/0332261 A1* | 10/2022 | Zou | .................... | B60R 13/0206 |

\* cited by examiner

TETHER CLIP AND PILLAR COUPLING STRUCTURE PROVIDED WITH THE SAME

CROSS-REFERENCE TO RELATED APPLICATION

This application claims priority to and the benefit of Korean Patent Application No. 10-2021-0097196 filed in the Korean Intellectual Property Office on Jul. 23, 2021, the entire contents of which are incorporated herein by reference.

BACKGROUND

(a) Technical Field

The present disclosure relates to a tether clip. More particularly, the present disclosure relates to a tether clip that is easy to assemble and has an increased opening amount, and to a pillar coupling structure provided with the same.

(b) Description of the Related Art

In general, an airbag system is a safety device for an occupant of a vehicle. The airbag system is a device for minimizing injuries by deploying an airbag between an occupant and a vehicle structure during a vehicle collision wherein the airbag directly collides with an occupant.

These airbag systems are installed in each part of the vehicle as needed. For example, the driver's seat airbag device is installed inside the steering wheel to protect the driver's upper body and head. A passenger's airbag device is mounted on the upper side of the glove box and is installed to protect the occupants in the passenger seat. Further, a curtain airbag (CAB) device, and the like, is deployed between an occupant and a door to protect the occupant during a side collision of a vehicle.

The curtain airbag is installed along the A-pillar of the vehicle. The curtain airbag protects the head of the occupant by preventing the occupant from leaving the vehicle in the event of a side collision or a rollover accident after a side collision.

When a vehicle collides, an inflator is operated according to a collision detection signal of an impact sensor, and the curtain airbag is inflated and deployed by compressed air generated from the inflator.

At this time, the pillar trim and the pillar panel are separated. The inflated curtain airbag is deployed into the gap between the pillar trim and the pillar panel. A tether clip is used to prevent the pillar trim from being completely separated from the pillar panel while creating a predetermined gap between the pillar trim and the pillar panel.

However, structural rigidity is insufficient due to the difference between the curtain airbag deployment direction and the tether clip opening direction. Furthermore, the boss of the pillar trim may be damaged or the pillar trim may be separated.

In addition, assembly is difficult when assembling the tether clip, due to the shape of the pillar trim. Furthermore, after-sales service (A/S) may be difficult when the tether clip is removed. If A/S is not possible, there may be cases where the entire tether clip needs to be replaced after the parts are removed.

In addition, during the part removal process, the panel hole may be deformed, or parts may be damaged. Also, the opening amount between the pillar trim and the pillar panel may vary when the curtain airbag is deployed. Therefore, it is desired that curtain airbag deployment is performed uniformly regardless of the interior layout.

The above information disclosed in this Background section is only to enhance understanding of the background of the disclosure. Therefore, the Background section may contain information that does not form the prior art that is already known in this country to a person of ordinary skill in the art.

SUMMARY

The present disclosure has been made in an effort to provide a tether dip that is easy to assemble and has an increased opening amount, and to provide a filler connection structure provided with the same.

A tether clip, according to an embodiment of the present disclosure may include a clip body having a panel anchor part and a trim anchor portion connected to the panel anchor part. A moving space is formed in the clip body and a trim trigger is formed in the trim anchor portion to be deformable in the moving space direction. The tether clip may further include a head anchor part having a head hook formed thereon and a tether connecting the clip body and the head anchor part The tether clip may also include a coupling pin inserted into the moving space and including an inclined slope configured to contact the trim trigger and move the coupling pin toward the panel anchor portion when the trim trigger is deformed inside.

The panel anchor part may include a deformable protruding panel hook and the coupling pin may include a pin support. When the coupling pin moves in the direction of the panel anchor part, the pin support may be positioned adjacent to the panel hook to suppress deformation of the panel hook.

The trim anchor portion may include a deformable protruding trim hook. When the trim hook deforms inward, the trim trigger may be connected to the trim hook so that the trim trigger pushes the slope.

The clip body may further include a body inner hook portion protruding to the inside. The coupling pin may further include a pin inner guide part that protrudes to be supported on the body inner hook portion.

The panel anchor part may further include a panel support protruding in the width direction.

The panel anchor part may further include a wing portion protruding from the panel support in the width direction and inclined toward the panel hook.

A guiding hole may be formed in the clip body, and the coupling pin may further include a guide rod configured to be inserted into the guiding hole.

The tether may include a curve part that is curved in an "L" shape.

A pillar coupling structure may include: a pillar panel; a pillar trim including a trim bracket having a head insert portion and an anchor insert portion formed thereon; and a clip body. The clip body may include a panel anchor part connected with the pillar panel and a trim anchor portion inserted into the anchor insert portion and connected to the panel anchor part. The clip body may have a moving space is formed therein. The pillar coupling structure may further include a head anchor part inserted into the head insert portion, a tether connecting the clip body and the head anchor part, and a coupling pin movably inserted inside the moving space.

The clip body may include a trim trigger configured to be deformable in the moving space direction. The coupling pin may include a slope or incline configured to move the coupling pin in the panel anchor part direction in contact with the trim trigger when the trim trigger is deformed inward.

The panel anchor part may include a deformable protruding panel hook and the coupling pin may include a pin support. Further, the pin support may be positioned adjacent to the panel hook to suppress deformation of the panel hook when the coupling pin moves in the direction of the panel anchor part.

The trim anchor portion may include a deformable protruding trim hook. The trim trigger may be connected to the trim hook so that the trim trigger pushes the slope when the trim hook deforms inward.

The clip body may include a body inner hook portion that protrudes to the inside. The coupling pin may include a pin inner guide part that protrudes to be supported on the body inner hook portion.

The panel anchor part may further include a panel support protruding in the width direction and a wing portion protruding in the width direction and inclined toward the panel hook.

A guiding hole may be formed in the clip body and the coupling pin may further include a guide rod configured to be inserted into the guiding hole.

The tether may include a curve part that is curved in an "L" shape.

The trim bracket may further include a head catching portion formed inside the head insert portion. The head anchor part may include a head hook that protrudes to be inserted into the head catching portion.

The trim bracket may have a maintenance hole formed toward the head catching portion.

The head insert portion may be inclined with respect to the direction of the anchor insert portion According to an embodiment of the tether clip and the pillar coupling structure of the present disclosure, it is easy to assemble and it is possible to secure the engaging force with the panel when the airbag is deployed.

According to an embodiment of the tether clip and the pillar coupling structure of the present disclosure, as the opening amount is increased, the possibility of interference when the airbag is deployed can be reduced.

According to an embodiment of the tether clip and the pillar coupling structure of the present disclosure, after-sales service (A/S) is possible through the maintenance hole, so it is possible to prevent damage to the pillar trim.

In addition, the effects obtainable or predicted by the embodiments of the present disclosure are disclosed directly or implicitly in the detailed description of the embodiments of the present disclosure. In other words, various effects predicted according to an embodiment of the present disclosure are disclosed in the detailed description provided below.

BRIEF DESCRIPTION OF THE DRAWINGS

Since the drawings are for reference in describing an embodiment of the present disclosure, the technical spirit of the present disclosure should not be construed as being limited to the accompanying drawings.

DETAILED DESCRIPTION

Figure 1:
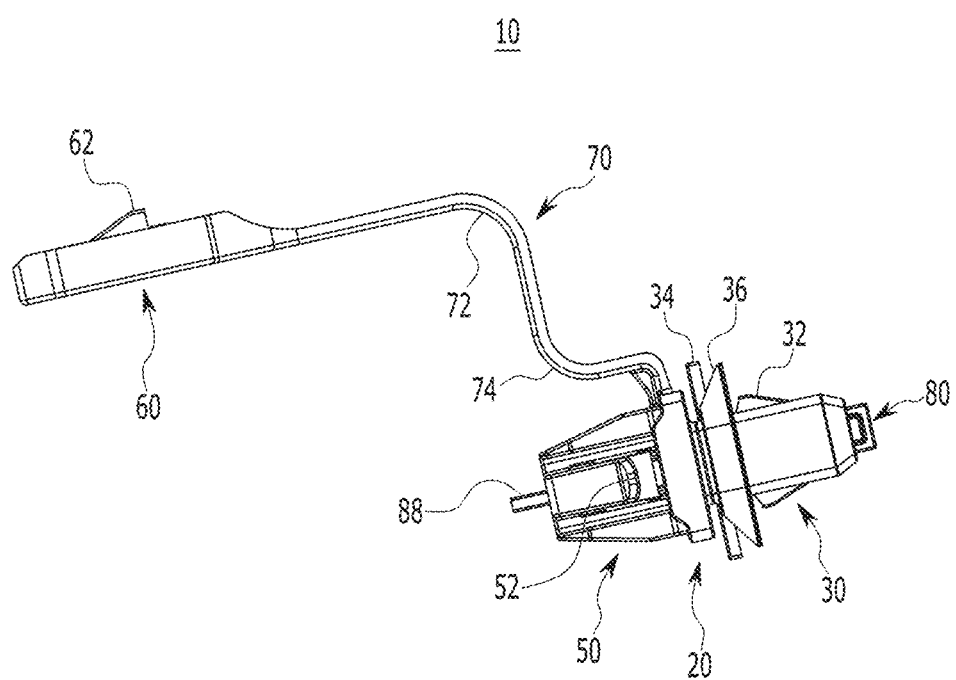
FIG. 1 is a front view before the assembly of a tether dip according to an embodiment of the present disclosure.

The present disclosure is described more fully hereinafter with reference to the accompanying drawings, in which embodiments of the inventive concept are shown. Those of ordinary skill in the art should realize that the described embodiments may be modified in various different ways, all without departing from the spirit or scope of the present disclosure.

In order to clearly explain the present disclosure, parts irrelevant to the description have been omitted. Also, the same reference numerals are assigned to the same or similar elements throughout the specification.

Since the size and thickness of each component shown in the drawings are arbitrarily indicated for convenience of description, the present disclosure is not necessarily limited to that shown in the drawings. The thickness may be enlarged to express various parts and regions more clearly.

In addition, in the following detailed description, the reason that the names of components are divided into first, second, and the like, is to distinguish them from one another and to classify them in the same relationship. It is not necessarily limited to any specific order in the following description.

Throughout the specification, when a part is said to include or comprise a certain element, it means that other elements may be further included, rather than excluding other elements, unless specifically stated otherwise.

In addition, terms such as part, means, or the like, as described in the specification, may mean a unit of a comprehensive configuration or assembly that performs at least one function or operation.

When a part, such as a layer, film, region, plate, or the like, is "on" another part, this includes not only the case where it is directly above or against the other part, but also the case where there is another part in between.

In contrast, when an element is referred to as being "directly on" another element, no intervening elements are present.

An embodiment of the present disclosure is hereinafter described in detail with reference to the accompanying drawings.

Figure 2:
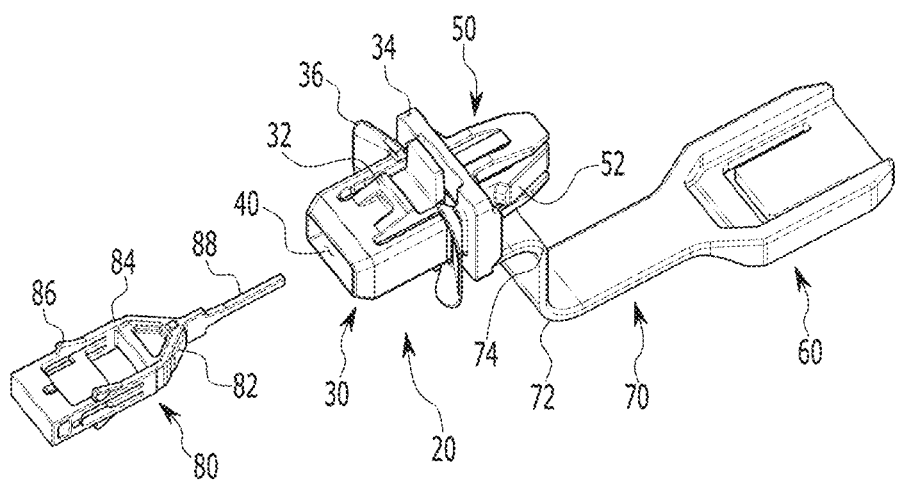
FIG. 2 is an exploded perspective view of a tether clip according to an embodiment of the present disclosure.

FIG. 1 is a front view of a tether clip, before it is assembled, according to an embodiment of the present disclosure. FIG. 2 is an exploded perspective view of a tether clip according to an embodiment of the present disclosure.

Referring to FIG. 1 and FIG. 2, a tether clip 10 according to an embodiment of the present disclosure may include a dip body 20 including a panel anchor part 30 and a trim anchor portion 50 connected to the panel anchor part 30. The tether dip may also include a head anchor part 60 with a head hook 62 formed or configured thereon, a tether 70 connecting the clip body 20 and the head anchor part 60, and a coupling pin 80.

A moving space 40 is formed or provided inside the dip body 20 and the coupling pin 80 may be inserted into the moving space 40. The coupling pin 80 includes an inclined (e.g., angled or ramped) slope 82.

The panel anchor part 30 may further include a panel support 34 protruding in the width direction and may further include a wing portion 36 protruding from the panel support 34 in the width direction inclined toward the panel hook 32.

In the detailed description and claims, the width direction is defined as a direction perpendicular to the longitudinal direction with respect to the panel anchor part 30.

A guiding hole 38 (referring to FIG. 12) is formed in the clip body 20. The coupling pin 80 may further include a guide rod 88 configured to be inserted into the guiding hole 38.

The tether 70 may include a curve part 72 that is curved in an "L" shape. In addition, the tether 70 may further include an adjacent curve part 74 that is curved in an "L" shape and adjacent to the clip body 20.

The curve part 72 is configured to secure a deployment space when the curtain airbag is deployed. The adjacent curve part 74 may minimize residual stress according to the mount shape of the tether clip 10. The tether clip 10 may be formed of an impact-resistant material. For example, the tether clip 10 may be formed of a material such as PolyAmid 66 (PA 66) but is not limited thereto.

The coupling pin 80 may be formed of a material having excellent impact strength and tensile strength. For example, the coupling pin 80 may be formed of a material such as Polyoxymethylene (POM) but is not limited thereto.

Figure 3:
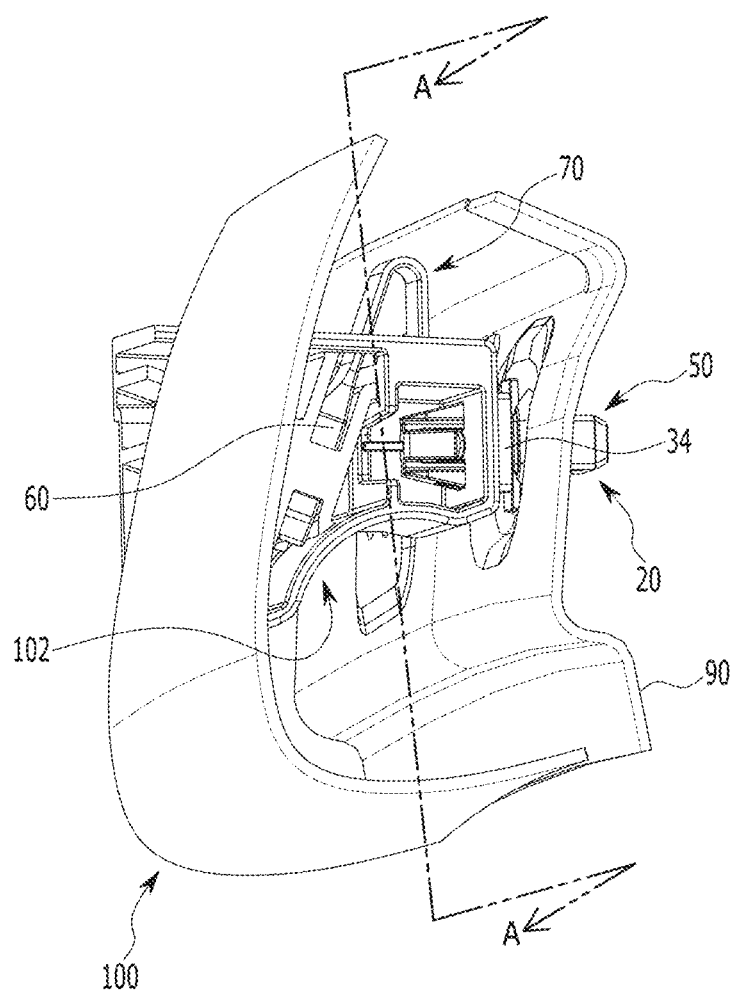
FIG. 3 is a partial perspective view of a pillar coupling structure according to an embodiment of the present disclosure.
Figure 4:
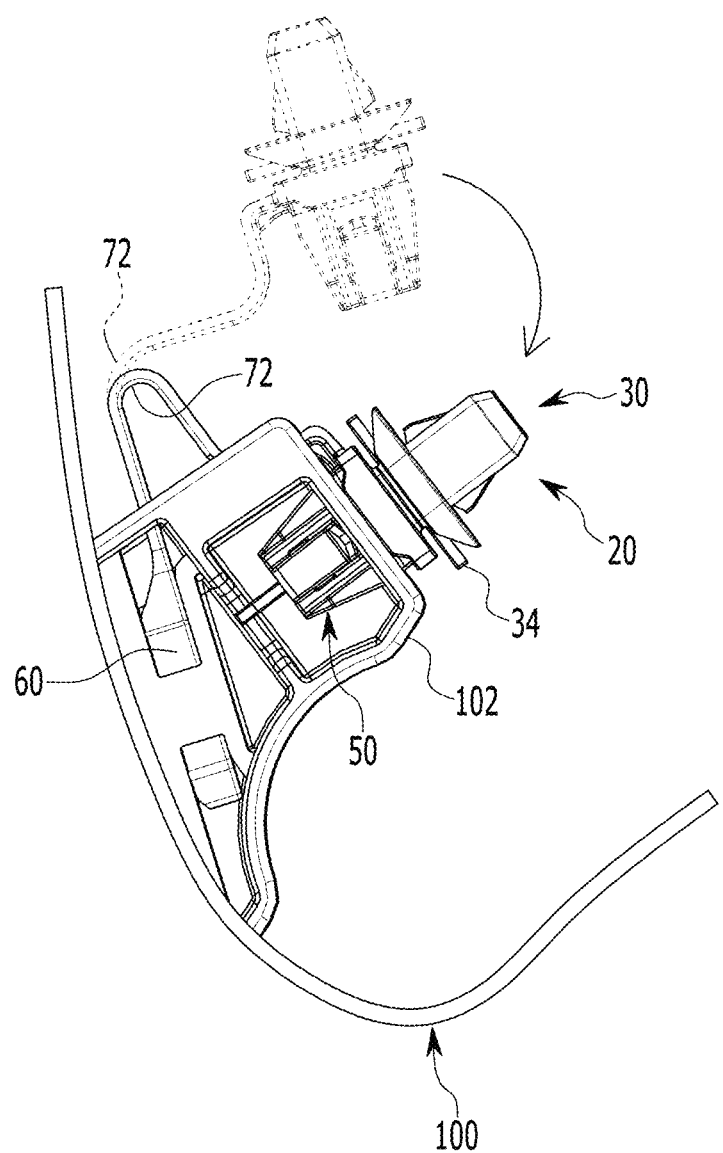
FIG. 4 is a view showing an assembly method of a pillar coupling structure according to an embodiment of the present disclosure.

FIG. 3 is a partial perspective view of a pillar coupling structure according to an embodiment of the present disclosure. FIG. 4 is a drawing showing an assembly method of a pillar coupling structure according to an embodiment of the present disclosure.

Figure 5:
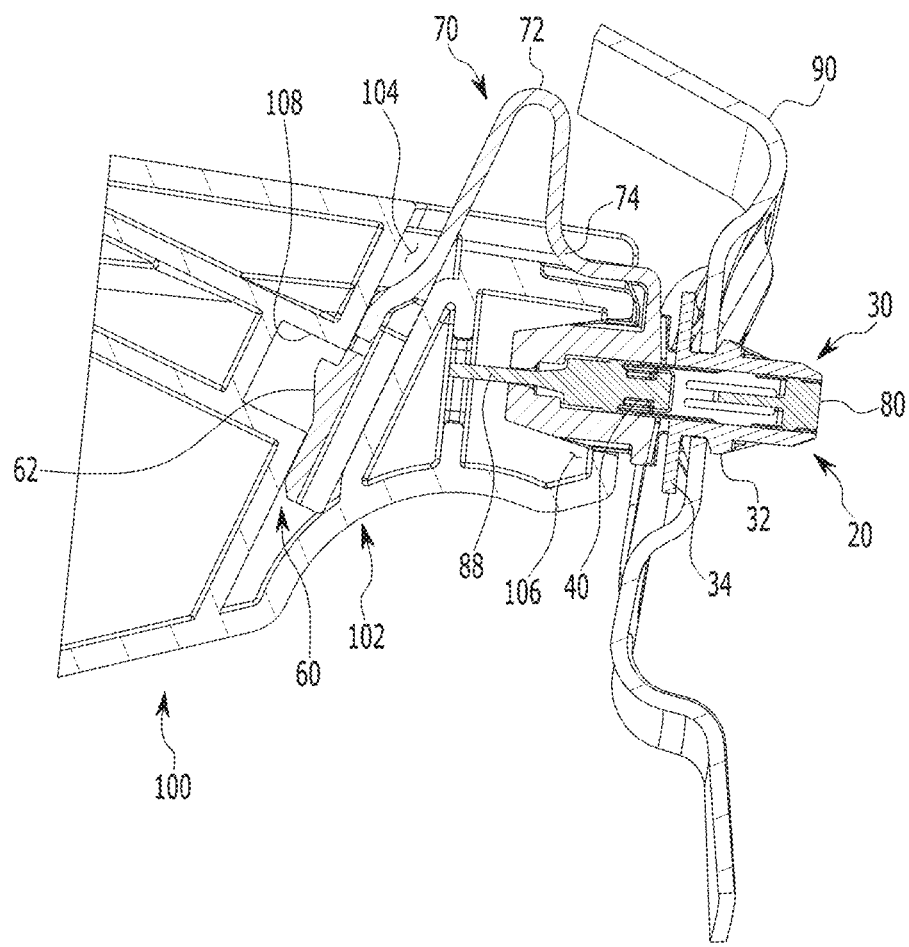
FIG. 5 is a cross-sectional view along the A-A line of FIG. 3.
Figure 6:
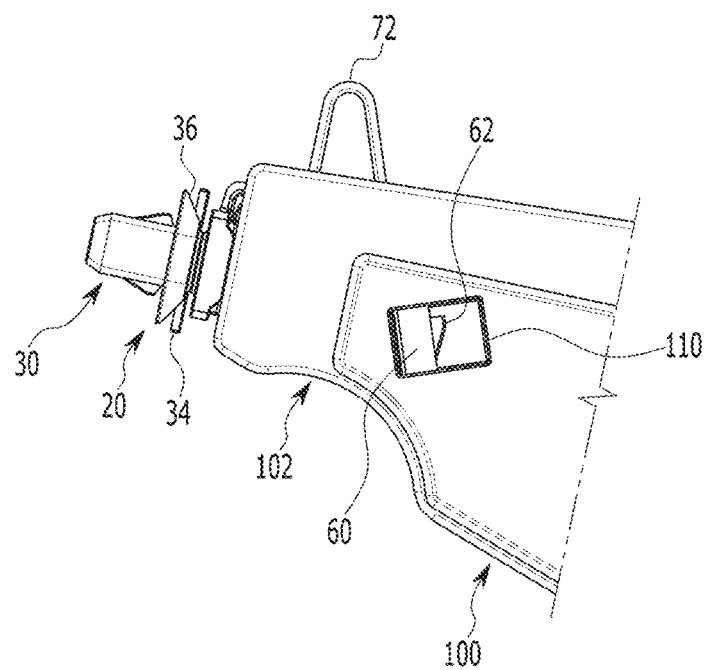
FIG. 6 is a view showing a maintenance hole of the pillar coupling structure according to an embodiment of the present disclosure.

FIG. 5 is a cross-sectional view along the A-A line of FIG. 3. FIG. 6 is a drawing showing a maintenance hole of the pillar coupling structure according to an embodiment of the present disclosure.

Figure 7:
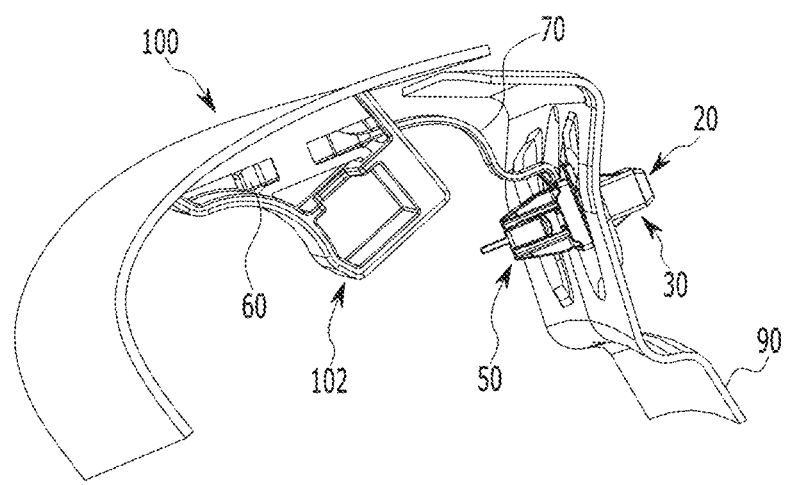
FIG. 7 is a view showing the operation in the airbag deployment of the pillar coupling structure according to an embodiment of the present disclosure.

FIG. 7 is a drawing showing the operation in the airbag deployment of the pillar coupling structure according to an embodiment of the present disclosure.

Referring to FIGS. 1-7, a pillar coupling structure according to an embodiment of the present disclosure is described.

The tether clip 10 described above may be applied to the pillar coupling structure according to an embodiment of the present disclosure.

A pillar coupling structure, according to an embodiment of the present disclosure, may include a pillar panel 90 and a pillar trim 100. The pillar trim 100 includes a trim bracket 102 formed with a head insert portion 104 and an anchor insert portion 106. Further, the tether clip 10 may be configured to connect the pillar trim 100 and the pillar panel 90.

The pillar panel 90 may be, for example, an A-pillar panel, but is not limited thereto.

The panel anchor part 30 may be coupled to the pillar panel 90. Further, the trim anchor portion 50 may be inserted into the anchor insert portion 106 and the head anchor part 60 may be inserted into the head insert portion 104.

The trim bracket 102 may further include a head catching portion 108 inside the head insert portion 104 and the head anchor part 60 may include the head hook 62 protruding to be inserted into the head catching portion 108. The head hook 62 is formed of a deformable material, for example, PA 66. The head hook 62 is deformed inside when inserted into the head insert portion 104, and then it returns to its original state and is supported by the head catching portion 108. Further, the head anchor part 60 may be fixed to the trim bracket 102.

A maintenance hole 110 may be formed in the trim bracket 102 toward the head catching portion 108. In other words, as shown in FIG. 6, when removing the head anchor part 60 from the trim bracket 102 for maintenance and the like, a tool may be inserted through the maintenance hole 110 to separate the head anchor part 60 from the trim bracket 102.

The head insert portion 104 may be inclined with respect to a direction of the anchor insert portion 106. In other words, as shown in FIG. 4 and FIG. 5, the head insert portion 104 is formed or provided in a direction that is not parallel or vertical to the direction of the anchor insert portion 106. Thus, it is easy to mount the tether clip 10 and the possibility of damage to the tether 70 may be suppressed by minimizing the load on the tether 70.

As shown in FIG. 7, when the curtain airbag is deployed, the pillar trim 100 is separated from the pillar panel 90, the curve part 72 is unfolded, and the airbag deployment space can be secured.

Figure 8:
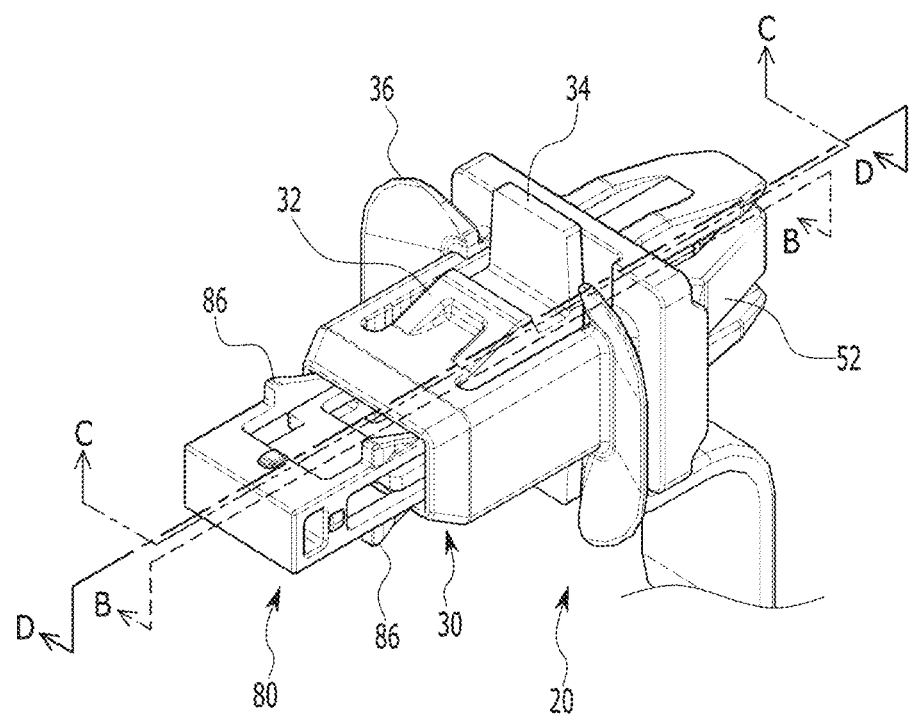
FIG. 8 is a partial perspective view of a tether clip according to an embodiment of the present disclosure.
Figure 9:
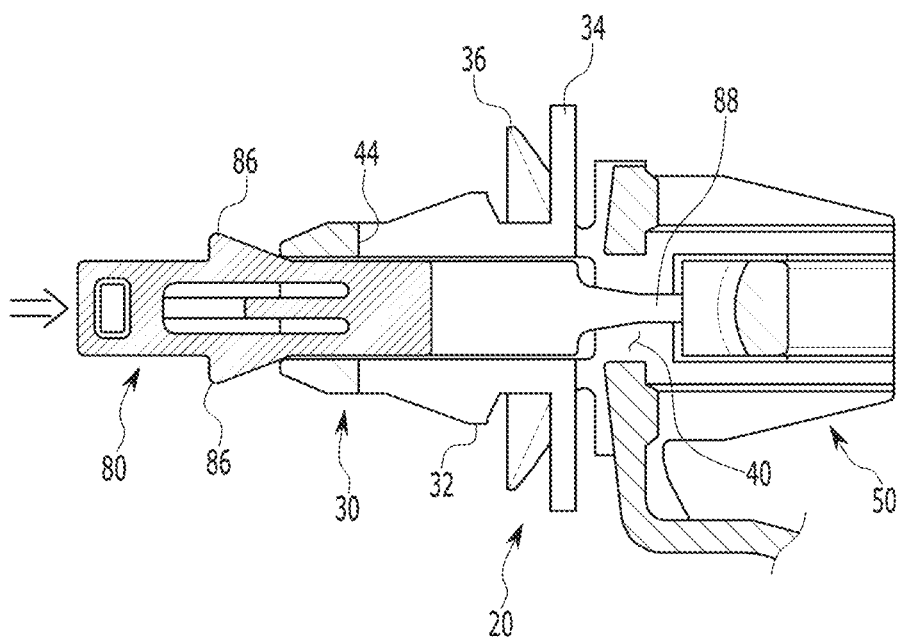
FIGS. 9-11 are cross-sectional views along line B-B of FIG. 8, and show a method of combining a coupling pin of the pillar coupling structure according to an embodiment of the present disclosure.

FIG. 8 is a partial perspective view of a tether clip, according to an embodiment of the present disclosure. Further, FIGS. 9-11 are cross-sectional views along line B-B of FIG. 8 and show a method of combining a coupling pin of the pillar coupling structure according to an embodiment of the present disclosure.

Referring to FIGS. 8-11, the clip body 20 may further include a body inner hook portion 44 protruding therein. The coupling pin 80 may further include a pin inner guide part 86 that protrudes to be supported on the body inner hook portion 44.

The clip body 20 and the coupling pin 80 are elastic materials, which can be deformed. Accordingly, as shown in FIGS. 9-11, when the coupling pin 80 is inserted into the moving space 40 and pushed inside it, the coupling pin 80 is advanced (e.g., a forward state) within the moving space 40.

Figure 10:
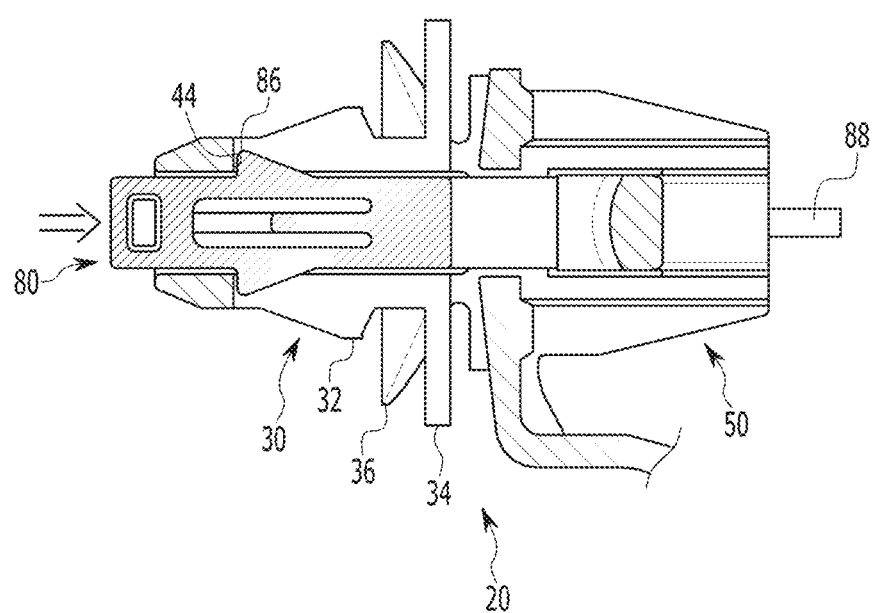
Figure 11:
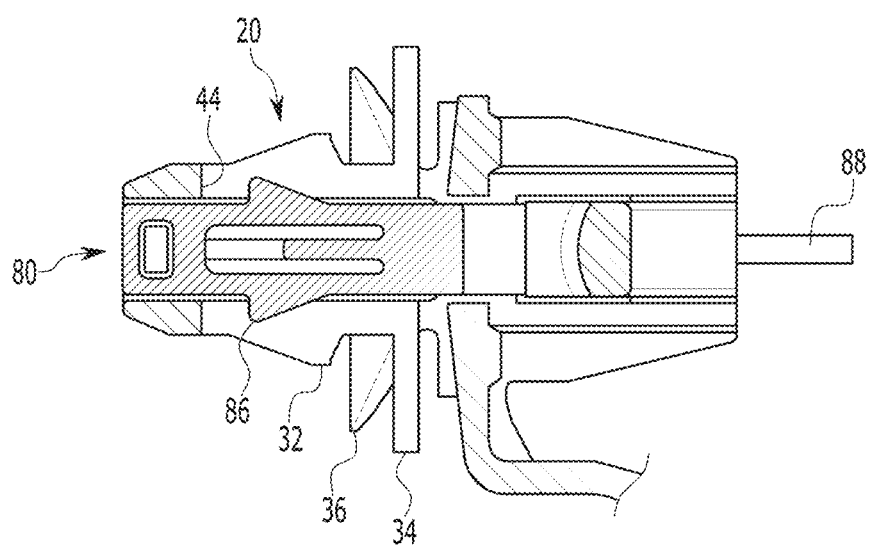

Here, the forward state may be defined as a state in which the coupling pin 80 is completely inserted into the moving space 40 as shown in FIG. 11 while a retracted state may be defined as a state in which the pin inner guide part 86 contacts and is supported by the body inner hook portion 44 as shown in FIG. 10.

Figure 12:
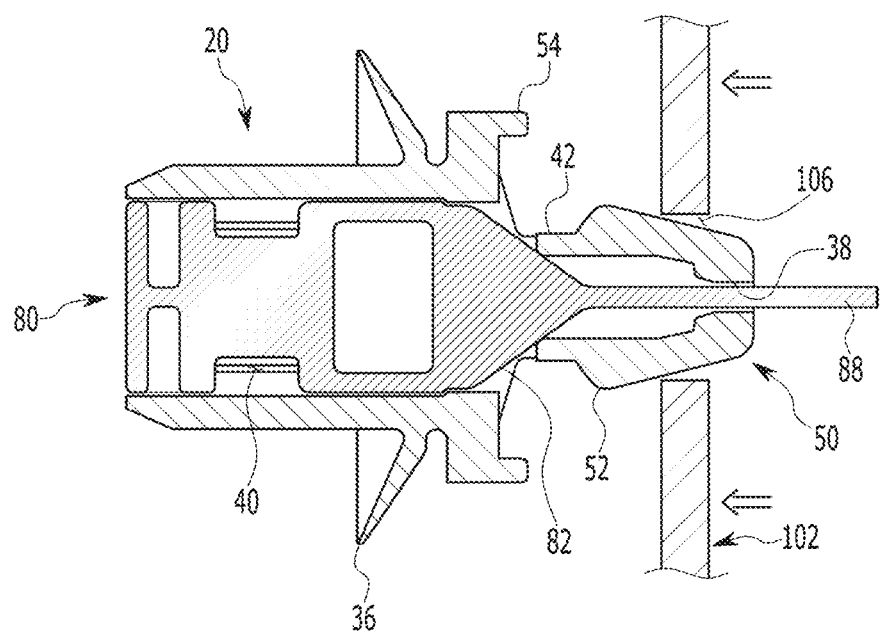
FIGS. 12 and 13 are cross-sectional views along line C-C of FIG. 8.
Figure 13:
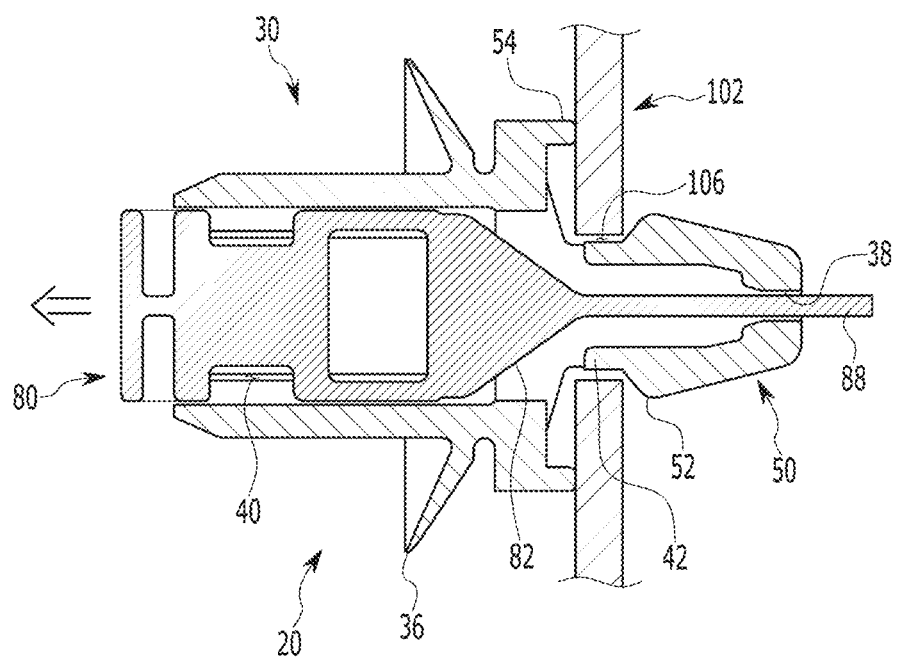

FIG. 12 and FIG. 13 are cross-sectional views along line C-C of FIG. 8 and show a method of combining a pillar trim of a pillar coupling structure according to an embodiment of the present disclosure.

The trim anchor portion 50 includes a deformable protruding trim hook 52. The trim trigger 42 may be connected to the trim hook 52 so that the trim trigger 42 pushes the slope 82 when the trim hook 52 deforms inward.

In other words, as shown in FIG. 12, when the trim anchor portion 50 is inserted and pushed into the anchor insert portion 106, the trim hook 52 is deformed inward thereof. Further, when the trim hook 52 is fully inserted into the anchor insert portion 106, the trim hook 52 can be returned to its original state, as shown in FIG. 13. In this case, the trim bracket 102 may be supported by a trim support 54 formed in the trim anchor portion 50.

At the same time, when the trim hook 52 is deformed inward, the trim trigger 42 connected to the trim hook 52 is also deformed inward and pushes the slope 82 and the coupling pin 80 can move in the direction of the panel anchor part 30. In other words, the coupling pin 80 is in the retracted state.

Figure 14:
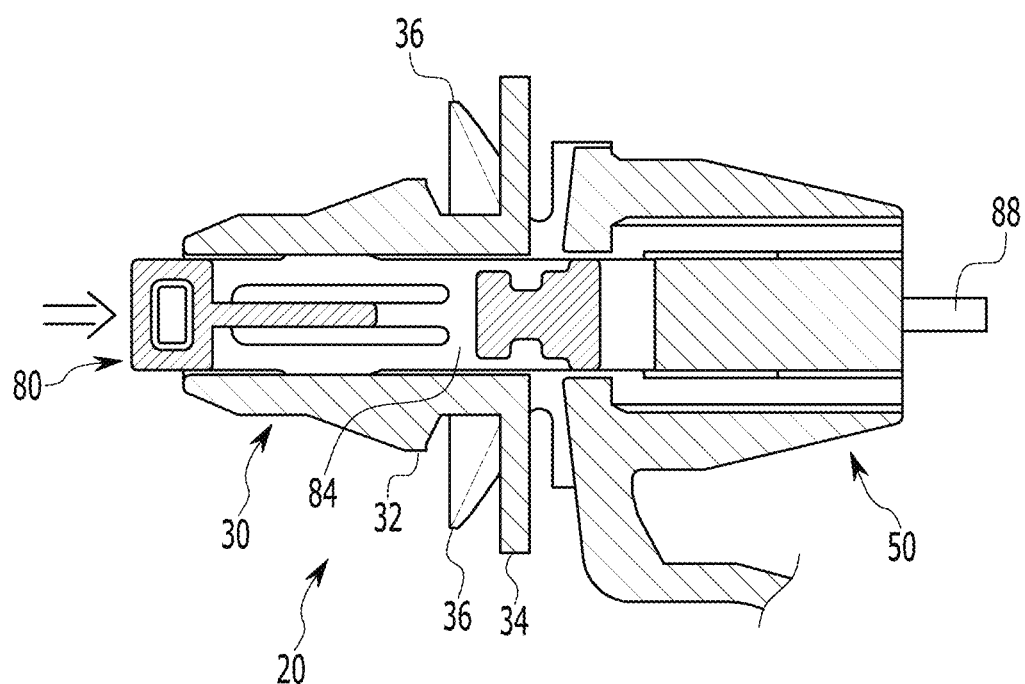
FIGS. 14 and 15 are cross-sectional views along line D-D of FIG. 8.
Figure 15:
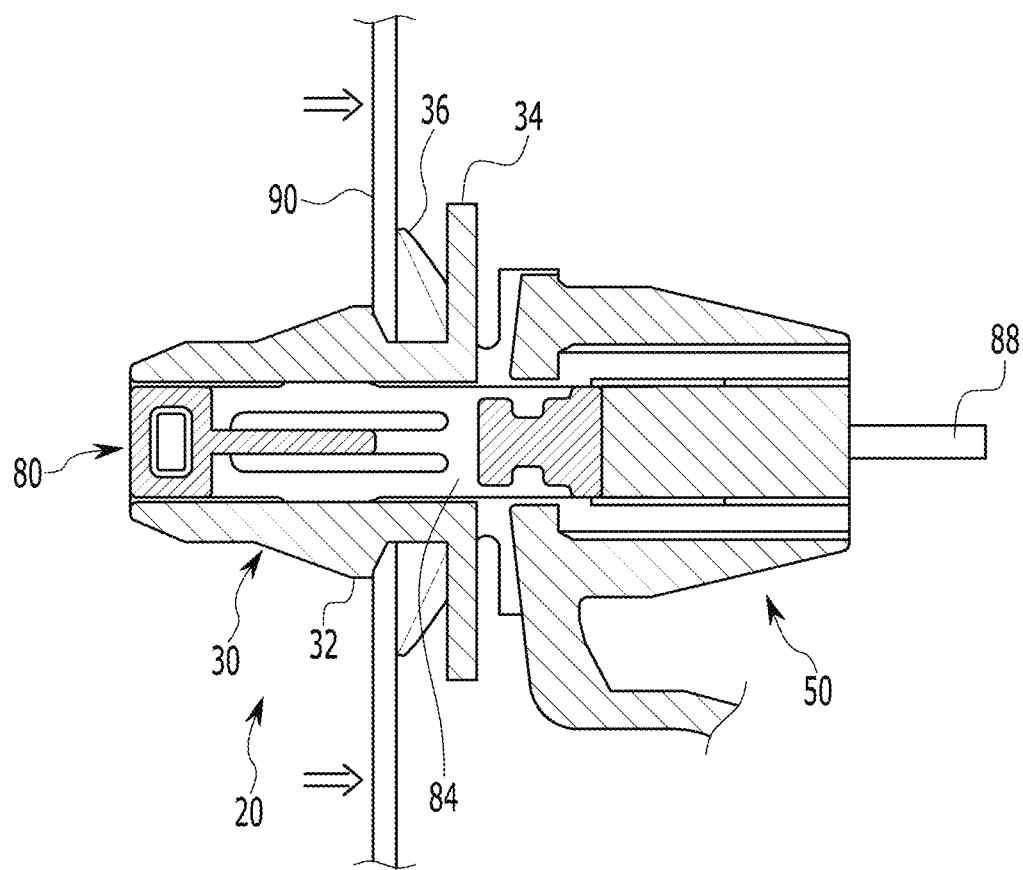

FIGS. 14 and 15 are cross-sectional views along line D-D of FIG. 8 and show a method of combining a pillar panel of a pillar coupling structure according to an embodiment of the present disclosure.

The panel anchor part 30 includes a deformable protruding panel hook 32 and the coupling pin 80 includes a pin support 84. The pin support 84 can suppress the inward deformation of the panel hook 32 when it is in a position adjacent to the panel hook 32.

When the pin support 84 is in an adjacent position to the panel hook 32, since the deformation of the panel hook 32 is suppressed, it may not be easy to assemble the pillar panel 90 and the panel anchor part 30.

Accordingly, the coupling pin 80 is pushed to the forward position as shown in FIG. 14 and the pillar panel 90 and the panel anchor part 30 are combined as shown in FIG. 15. When the pillar panel 90 and the panel anchor part 30 are joined, the panel hook 32 returns to its original state and the pillar panel 90 is supported by the panel hook 32 and the wing portion 36.

Figure 16:
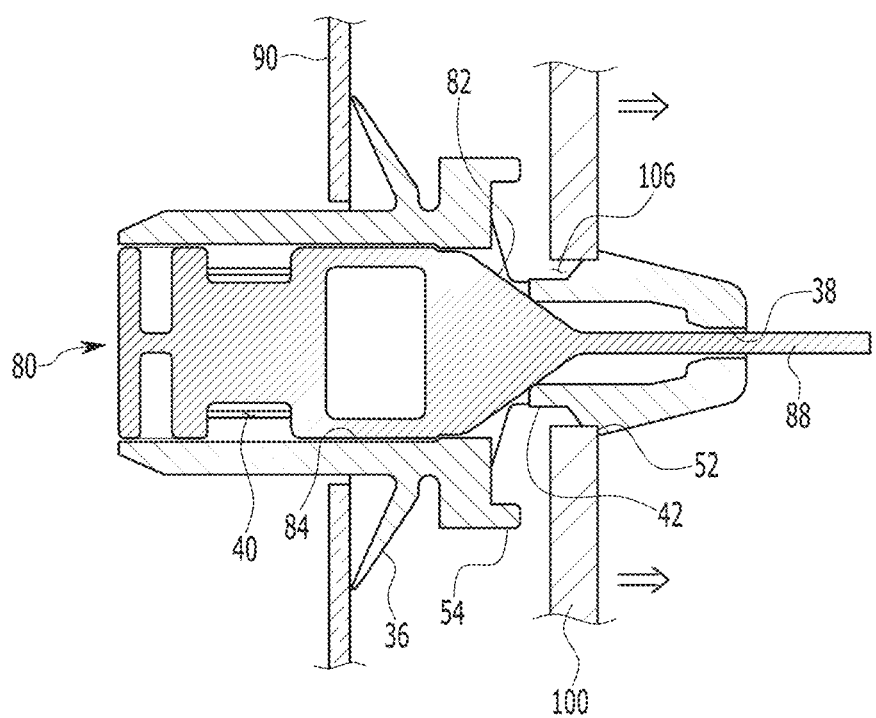
FIGS. 16 and 17 are cross-sectional views along line C-C of FIG. 8.
Figure 17:
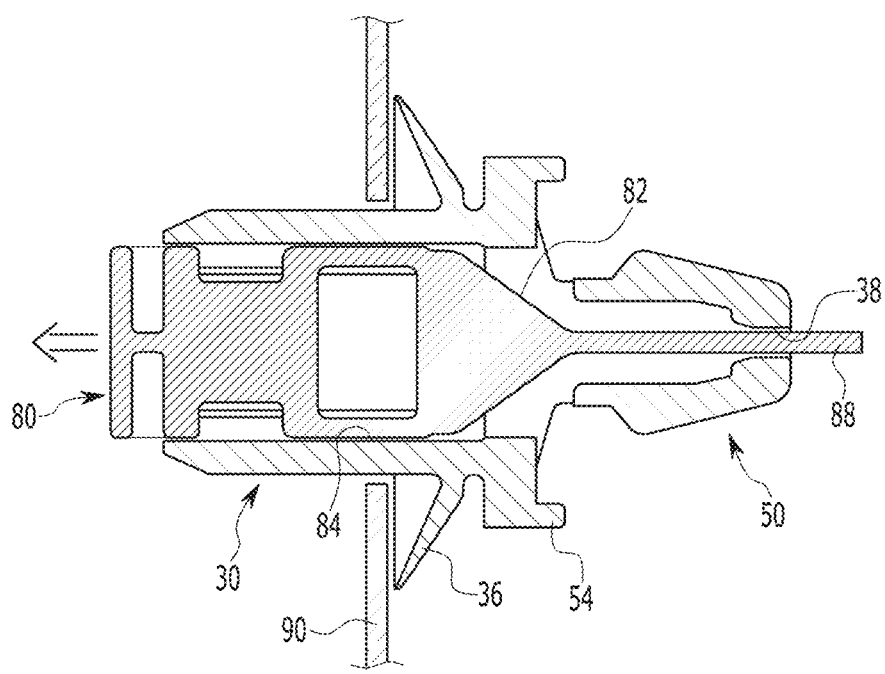

FIGS. 16 and 17 are cross-sectional views along line C-C of FIG. 8 and show the operation at the time of airbag deployment of the pillar coupling structure according to an embodiment of the present disclosure.

Figure 18:
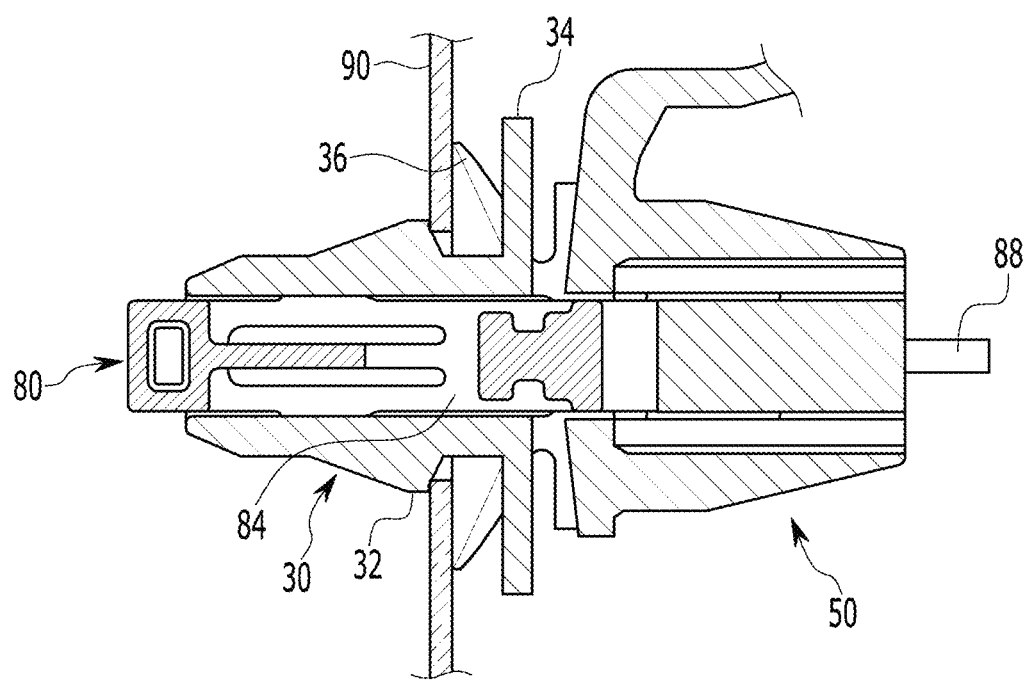
FIG. 18 is a cross-sectional view along line D-D of FIG. 8.

FIG. 18 is a cross-sectional view along line D-D of FIG. 8 and it shows the state after the airbag deployment of the pillar coupling structure according to an embodiment of the present disclosure.

When the airbag is deployed, as shown in FIG. 16, the pillar trim 100 pushes the trim hook 52 and the trim hook 52 is deformed inward. At the same time, the trim trigger 42 connected to the trim hook 52 is deformed inward and the slope 82 is pushed. Then, the coupling pin 80 moves in the direction of the panel anchor part 30 and, as shown in FIG. 17 and FIG. 18, the coupling pin 80 is retracted.

Then, the coupling pin 80 moves in the direction of the panel anchor part 30 and the pin support 84 may be positioned adjacent to the panel hook 32 to suppress deformation of the panel hook 32. Accordingly, the separation of the pillar panel 90 and the panel anchor part 30 can be suppressed.

Figure 19:
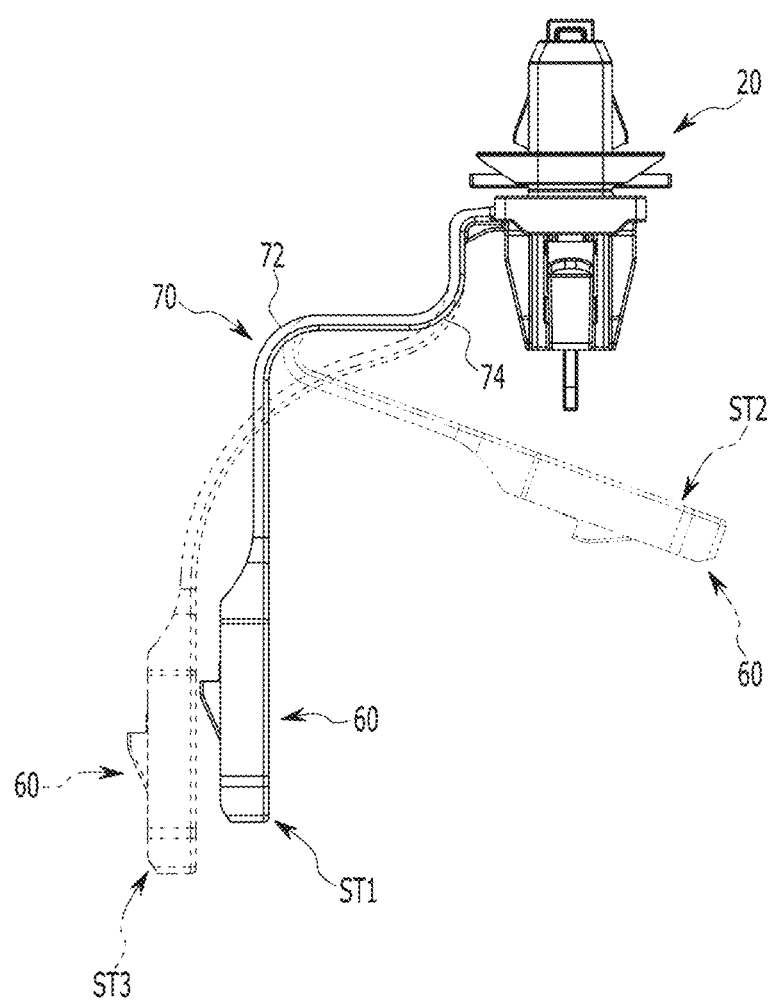
FIG. 19 is a view comparing the operation state of the tether clip according to an embodiment of the present disclosure.

FIG. 19 is a drawing comparing the operational state of the tether dip according to an embodiment of the present disclosure.

As shown in FIG. 19, the tether dip 10 according to an embodiment of the present disclosure maintains the curved shape of the curve part 72 in an "L" shape in a state ST1 before assembly. Further, in a state ST2 after assembly, the curve part 72 is bent but the amount of deformation is not large, so residual stress can be minimized. In addition, when the airbag is deployed in a state ST3, the curve part 72 is deformed and an airbag deployment space may be formed, thereby preventing interference when the airbag is deployed.

As described above, in an embodiment of the present disclosure, the coupling pin 80 moves in the direction of the panel anchor part 30 when the airbag is deployed. Thus, the pin support 84 is positioned adjacent to the panel hook 32 to suppress the deformation of the panel hook 32 so that the separation of the pillar panel 90 and the panel anchor part 30 can be suppressed.

While this disclosure has been described in connection with what are presently considered to be practical embodiments, it is to be understood that the disclosure is not limited to the disclosed embodiments. On the contrary, this disclosure is intended to cover various modifications and equivalent arrangements included within the spirit and scope of the appended claims.

<Description of symbols>

| | |
|---|---|
| 10: tether clip | 20: clip body |
| 30: panel anchor part | 32: panel hook |
| 34: panel support | 36: wing portion |
| 38: guiding hole | 40: moving space |
| 42: trim trigger | 44: body inner hook portion |
| 50: trim anchor portion | 52: trim hook |
| 54: trim support | 60: head anchor part |
| 62: head hook | 70: tether |
| 72: curve part | 74: adjacent curve part |
| 80: coupling pin | 82: slope |
| 84: pin support | 86: pin inner guide part |
| 88: guide rod | 90: pillar panel |
| 100: pillar trim | 102: trim bracket |
| 104: head insert portion | 106: anchor insert portion |
| 108: head catching portion | 110: maintenance hole |

What is claimed is:

1. A tether clip comprising:
a clip body including a panel anchor part and a trim anchor portion connected to the panel anchor part, the clip body having a moving space therein, wherein a trim trigger in the trim anchor portion is deformable in a moving space direction toward the panel anchor part;
a head anchor part having a head hook thereon;
a tether connecting the clip body and the head anchor part; and
a coupling pin inserted into the moving space and including an inclined slope configured to contact the trim trigger and move the coupling pin toward the panel anchor part when the trim trigger is deformed inside.

2. The tether clip of claim 1, wherein:
the panel anchor part comprises a deformable protruding panel hook;
the coupling pin comprises a pin support; and
when the coupling pin moves in a direction of the panel anchor part, the pin support is positioned adjacent to the panel hook to suppress deformation of the panel hook.

3. The tether clip of claim 2, wherein:
the trim anchor portion comprises a deformable protruding trim hook; and
when the trim hook deforms inward toward the panel anchor part, the trim trigger is connected to the trim hook so that the trim trigger pushes the inclined slope.

4. The tether clip of claim 1, wherein:
the clip body further comprises a body inner hook portion protruding to the inside in a direction toward the moving space; and the coupling pin further comprises a pin inner guide part that protrudes to be supported on the body inner hook portion.

5. The tether clip of claim 1, wherein
the panel anchor part further comprises a panel support protruding in a width direction.

6. The tether clip of claim 5, wherein
the panel anchor part further comprises a wing portion protruding from the panel support in the width direction and inclined toward a panel hook.

7. The tether clip of claim 1, wherein:
a guiding hole in the clip body; and
the coupling pin further comprises a guide rod configured to be inserted into the guiding hole.

8. The tether clip of claim 1, wherein
the tether comprises a curve part that is curved in an "L" shape.

9. A pillar coupling structure comprising:
a pillar panel;
a pillar trim including a trim bracket having a head insert portion and an anchor insert portion thereon;
a clip body including a panel anchor part connected with the pillar panel and a trim anchor portion inserted into the anchor insert portion and connected to the panel anchor part, the clip body having a moving space therein;
a head anchor part inserted into the head insert portion;
a tether connecting the clip body and the head anchor part; and
a coupling pin movably inserted inside the moving space,
wherein the clip body comprises a trim trigger configured to be deformable in a moving space direction toward the panel anchor part, and
wherein the coupling pin comprises a slope configured to move the coupling pin in a panel anchor part direction in contact with the trim trigger when the trim trigger is deformed.

10. The pillar coupling structure of claim 9, wherein:
the panel anchor part comprises a deformable protruding panel hook;
the coupling pin comprises a pin support; and
the pin support is positioned adjacent to the panel hook to suppress deformation of the panel hook when the coupling pin moves in a direction toward the panel anchor part.

11. The pillar coupling structure of claim 9, wherein:
the trim anchor portion comprises a deformable protruding trim hook; and
the trim trigger is connected to the trim hook so that the trim trigger pushes the slope when the trim hook deforms inward toward the panel anchor part.

12. The pillar coupling structure of claim 9, wherein:
the clip body comprises a body inner hook portion protruding to the inside in a direction toward the moving space; and
the coupling pin comprises a pin inner guide part that protrudes to be supported on the body inner hook portion.

13. The pillar coupling structure of claim 9, wherein the panel anchor part further comprises:
a panel support protruding in a width direction; and
a wing portion protruding in the width direction inclined toward a panel hook.

14. The pillar coupling structure of claim 9, wherein:
a guiding hole is provided in the clip body; and
the coupling pin further comprises a guide rod configured to be inserted into the guiding hole.

15. The pillar coupling structure of claim 9, wherein
the tether comprises a curve part that is curved in an "L" shape.

16. The pillar coupling structure of claim 9, wherein:
the trim bracket further comprises a head catching portion inside the head insert portion; and
the head anchor part comprises a head hook that protrudes to be inserted into the head catching portion.

17. The pillar coupling structure of claim 16, wherein
the trim bracket has a maintenance hole arranged toward the head catching portion.

18. A pillar coupling structure comprising:
a pillar panel;
a pillar trim including a trim bracket having a head insert portion and an anchor insert portion thereon;
a clip body including a panel anchor part connected with the pillar panel and a trim anchor portion inserted into the anchor insert portion and connected to the panel anchor part, the clip body having a moving space therein;
a head anchor part inserted into the head insert portion;
a tether connecting the clip body and the head anchor part; and
a coupling pin movably inserted inside the moving space,
wherein the head insert portion is inclined with respect to an orientation of the anchor insert portion.

* * * * *